Sept. 30, 1952 L. R. SIMMONS 2,612,279
WEIGHT-SHIFTING LOGGING SULKY
Filed March 29, 1949 2 SHEETS—SHEET 1
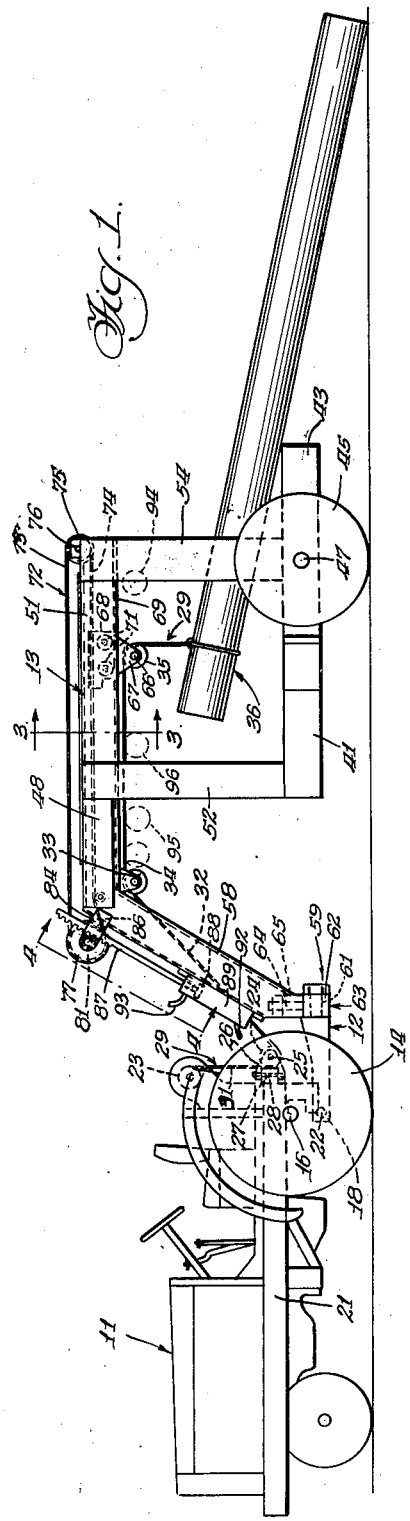
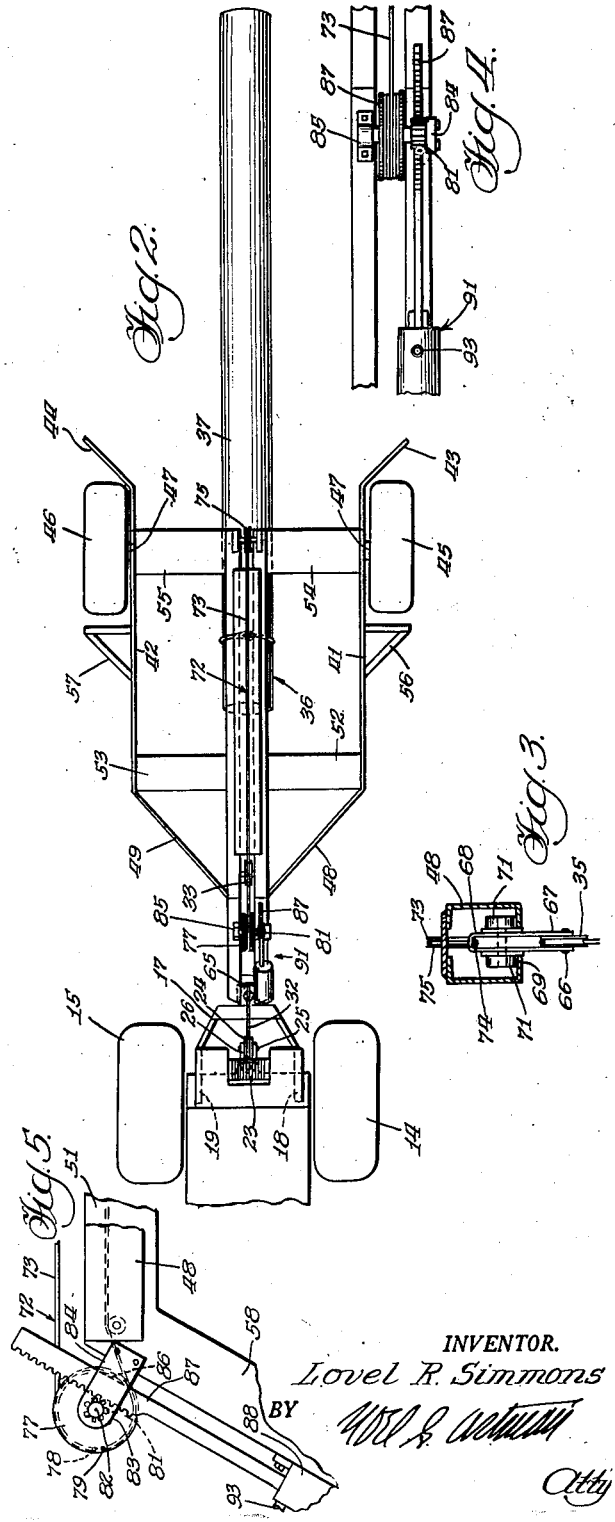
INVENTOR.
*Lovel R. Simmons*
BY
Atty

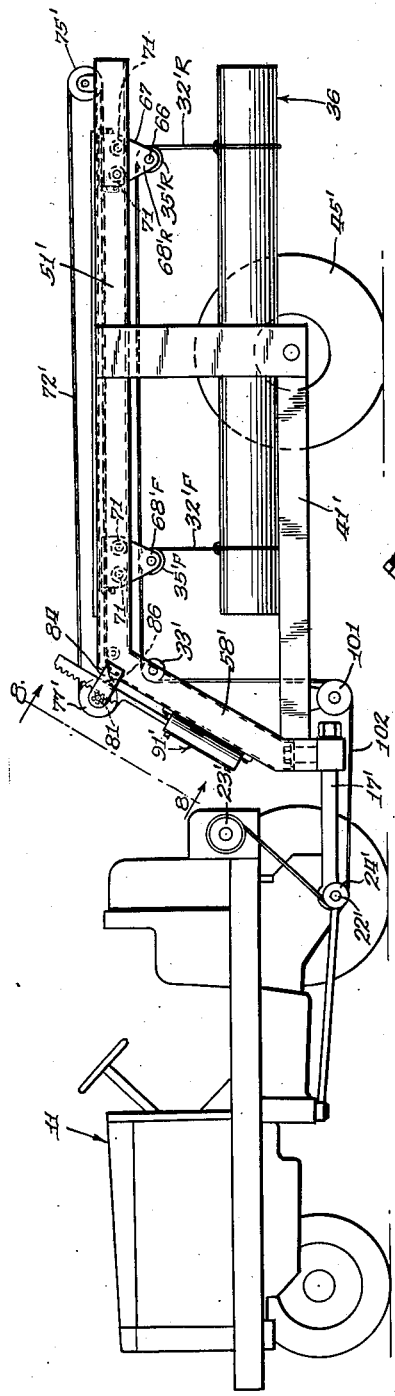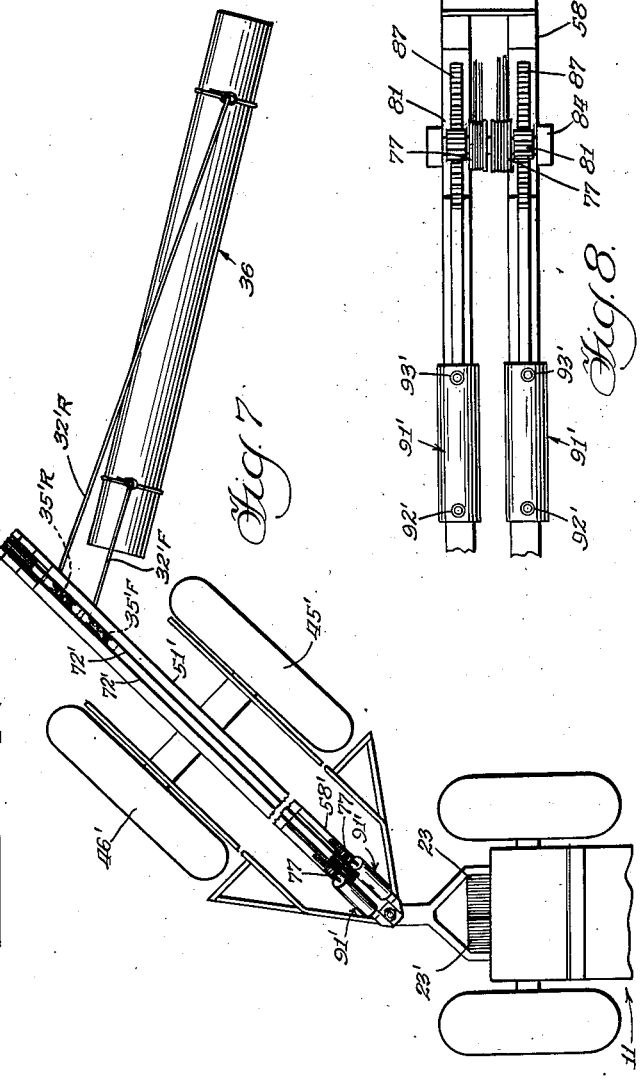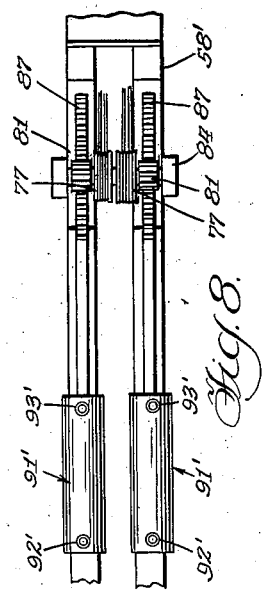

Patented Sept. 30, 1952

2,612,279

UNITED STATES PATENT OFFICE 2,612,279

WEIGHT-SHIFTING LOGGING SULKY

Lovel Reynolds Simmons, Jackson, Miss.

Application March 29, 1949, Serial No. 84,214

3 Claims. (Cl. 214—65.3)

This invention has to do with material-conveying vehicles of the sulky type and concerns more particularly a vehicle constructed and equipped to facilitate shifting of the load thereon for changing the amount of weight imposed upon the traction wheels of a tractor onto which the vehicle is coupled.

The invention has particular utility when incorporated into the structure of a sulky vehicle used for transporting elongated objects such as logs or piles of lumber. The conventional logging sulky comprises a frame supported upon wheels at opposite of its sides and being open at its back side for accommodating endwise insertion of the elongated load. Sheaves are secured in an upper portion of the frame in a manner that a cable or cables may be payed out thereover for attachment to the load and thereafter wound in over the sheaves, usually by means of a winch upon the tractor, for dragging the load forwardly through the open rear end of the frame. After the load has been drawn endwise into the sulky trailer onto the bottom thereof, the bottom will be elevated to raise the load and support it while the tractor and trailer are driven to a desired location.

Frequently, because of the length of the load being transported on the sulky vehicle, the trailing end of such load will be allowed to drag upon the ground. This, of course, increases the resistance to tractive effort exerted by the traction wheels of the tractor. Much of the hauling performed by a vehicle train of this type is off the highway where the course being traversed will frequently contain earth depressions and hummocks which further contribute to the resistance to tractive effort. These adverse conditions are at time augmented by wet, muddy or slippery earth. To enable the tractor to possess sufficient tractive contact with the ground it has been necessary to employ weights upon the traction wheels and/or to resort to a large tractor having weight and horsepower commensurate with the peak requirements of tractive effort. This is not a satisfactory way of approaching the problem however, since the more massive and costly equipment is only periodically used to the limit of it capabilities.

A general object of the present invention is the provision of a logging sulky vehicle with load carrying means capable of shifting the weight of the load upon such vehicle for imposing desired amounts of the load upon the traction wheels of the tractor in accordance with the amount of tractive effort needed. In this way the apparatus can utilize the weight of the load for supplementing the weight of the tractor chassis during short periods requiring abnormal tractive effort. In this way a lighter and less costly tractor can be employed. Also, it is possible to cause essentially the entire weight of the load to be carried by the trailing vehicle during favorable tractive conditions which predominantly prevail, thereby preserving the tractor frame and tires by avoiding placing useless inordinate weight upon them.

A more specific object of this invention is the provision of a logging sulky having an overhead fore and aft track or the like together with mounting means movable lengthwise thereof for supporting sheaves over which cable means is trained for attaching to and supporting the load. An overhead supporting means of this character for load-supporting sheave means makes it possible to control the position of the sheaves and of the load from a control disposed accessibly to an operator upon the tractor. Movement of the load-supporting sheave means forwardly of the sulky wheels will cause the amount of weight imposed by the load upon the tractor to be increased while movement of the sheave means rearwardly decreases the magnitude of such imposed weight.

A further object is the provision of a logging sulky wherein the frame is open at the bottom as well as at the rear to facilitate dragging the load by means of the load-supporting cable forwardly into the frame or, backing the sulky into straddling relation over the load and thereafter elevating the same by means of the cable into a transport position.

The invention further contemplates and has as one of its objects the provision of a plurality of load-supporting sheaves spaced lengthwise of the fore and aft extending track and having respective load-supporting cables trained thereover for attachment to the load at fore and aft positions, whereby these cables can be "wound-in" to lift the load completely off of the ground. This diminishes the tractive effort necessary for advancing the loaded vehicle train.

A further object is the provision of a logging sulky having an unobstructed open bottom and an unobstructed rear end together with an overhead tract extending axially of such sulky both forwardly and rearwardly of the sulky wheels, together with load supporting sheave means adjustable lengthwise of the track between positions respectively forwardly and rearwardly of the wheels.

Still another object is the provision of a logging sulky according to any of the preceding objects and having a cable or line-guiding pulley in a forward portion thereof for guiding a flight of the load-supporting cable or line extending between such pulley and a line-guiding pulley on the back end of the tractor, and said line-guiding pulleys being so relatively disposed in elevation as to so place the center-line of such line flight that it substantially intersects a drawbar hitch point substantially beneath the traction wheel axis of the tractor.

Another object is the provision of an improved hitch structure between the logging sulky and the tractor, embodying a bale type drawbar having its end portions pivotally connected with the tractor for movement about a transverse axis in parallelism with the traction wheel axis and slightly therebeneath while the intermediate portion of such drawbar is disposed rearwardly and pivotally supports thereon (about a fore and aft extending axis) a universal joint structure having a bearing portion generated about a substantially vertical axis and pivotally connected with a complemental bearing rigidly associated with the trailing vehicle.

These and other objects inherent in and encompassed by the invention will be more fully understood from the ensuing description, the appended claims and the annexed drawings, wherein:

Fig. 1 is a side elevational view of a tractor and logging sulky coupled thereto and embodying a preferred form of the invention.

Fig. 2 is a fragmentary plan view illustrating the apparatus shown in Fig. 1.

Fig. 3 is a sectional view taken on the line 3—3 of Fig. 1.

Fig. 4 is a view taken on the line 4—4 of Fig. 1.

Fig. 5 is an enlarged fragmentary view in side elevation illustrating the mounting of a sheave shifting ram on the goose-neck tongue of the sulky.

Fig. 6 is a view taken similarly to Fig. 1 illustrating a second form of the invention.

Fig. 7 is a plan view of the apparatus shown in Fig. 6, the tractor being shown fragmentarily, the tractor and sulky being illustrated in relative positions occupied while executing a turn, and the load-supporting sheaves and lines being illustrated while suspended at a rear portion of the sulky track to expedite manipulation of the lines for attachment or detachment of the load.

Fig. 8 is a view taken on the line 8—8 of Fig. 6.

With continued reference to the drawings and particularly to Figs. 1 and 2 the tractor is designated 11 and the logging sulky coupled thereto by an articulated hitch structure 12 is designated 13. The tractor has laterally spaced traction wheels 14 and 15 of the rubber tire variety mounted upon the rear end thereof for rotation about a common axis 16.

The hitch structure 12 includes a generally U-shaped drawbar 17 having its laterally spaced front ends 18 and 19 pivotally connected with the rear end of the tractor body 21 for swinging about a transverse horizontal axis 22 slightly below and in parallelism with the traction wheel axis 16.

A winch 23 of conventional structure is mounted upon the rear part of the tractor body above a cable guide pulley 24 which is rotatable about a pin 25 having its opposite ends supported in the usual furcations of a sheave housing 26 pivotally supported upon a pintle 27 disposed vertically and rigidly attached to the rear end of the tractor body by a bracket 28. A load-supporting cable 29 windable onto and payable out from the winch 23 has a flight 31 extending downwardly to the pulley 24 about which the cable or line extends and merges into a flight 32 extending upwardly and rearwardly to and about a load cable guiding pulley 33. A more rearward flight 34 of the cable extends to and over a load-supporting sheave 35 from which the cable extends downwardly for connection with the load 36 which is herein illustrated in form of logs 37.

The logging sulky 13 comprises a frame wherein there are laterally spaced side members 41 and 42 bent into shape from plate metal stock. Trailing end portions 43 and 44 of these frame side members are turned outwardly to provide shields for wheels 45 and 46. These wheels are mounted upon stub and axles 47 which project outwardly from the frame side members 41 and 42 and provide support for the rear portion of the frame. Converging front end portions 48 and 49 of the side frame members may be formed integrally or may be connected rigidly together at their front ends. A track structure 51 is supported in elevated relation with respect to the frame side members 41 and 42 by means of a forward set of side frame members 52 and 53 which extend oppositely from the track structure and downwardly therefrom into respective connection with the members 41 and 42. A rear set of side frame members 54 and 55, shaped to provide clearance for the load 36, support the rear part of the track 51 upon the frame sills 41 and 42.

Shields 56 and 57 for the wheels 45 and 46 are mounted upon the outer faces of the frame sills.

A tongue or coupling-attaching structure 58 rigidly associated with the front end of the track structure projects downwardly and forwardly for attachment to the drawbar 17 by means of a universal joint structure 59. The universal joint comprises a bearing stud 61 having a sleeve portion 62 of a compound bearing unit 63 journalled thereon. Another component of the unit 63 is a bearing stem 64 rigidly associated with the sleeve 62 and projecting radially therefrom in an upward direction. The bearing stem 64 is received by a cylindrical bearing 65 in the lower end of the tongue 58.

The traveling or load-supporting sheave 35 is journalled upon a pintle 66 extending between apertured ears 67 projecting from a carriage 68 supported upon longitudinally extending track flanges 69 by means of carriage rollers 71. This carriage 68 together with its rollers 71 constitutes means for mounting the sheave 35 upon the track flange means 69 and is adjusted lengthwise of the track by means of a cable 72 having upper and lower flights 73 and 74 extending lengthwise of the track. A mid-portion of the cable is trained about a pulley 75 journalled upon a pin 76 mounted on a rear-part of the track frame. A forward end of the cable flight 73 extends over the upper part of a large diameter spool 77 and is attached thereto at 78. A forward end of the lower cable flight 74 extends about the periphery of the spool 77 twice and is then anchored thereto at 79.

A pinion 81 and the spool 77 are both constrained for rotation with a shaft 82 which is journalled in bearings 83 of brackets 84 and 85, Fig. 4, mounted upon the upper part of the tongue 58. Bracket 84 has a bearing surface 86 against which a rack 87 having teeth meshed with the pinion 81 slides. This rack 87 is formed by an end portion of the piston rod for a piston 88 in the cylinder 89 of a hydraulic ram 91. The ram cylinder is mounted on the upper side of the tongue 58. Opposite ends of the ram cylinder communicate through flexible hoses 92 and 93 with a valve of any conventional structure (not shown) mounted accessibly to the operator on the tractor. Such valve structure is operable to selectively direct fluid under pressure into either of the hoses 92 or 93 while establishing communication through the other of such hoses with a low pressure reservoir, so the hydraulic ram can be caused to move the rack 87 in either endwise direction.

When the piston 88 is in the lower end of the cylinder the rack and pinion 87—81 will cause the spool 77 to occupy its most clockwise position. This will have been accomplished by introducing fluid under pressure into the hose 93 while exhausting fluid through the hose 92, and will have operated the cable 72 for at least supplementing the force of tension in the cable flight 34 for moving the sheave 35 to its most forward position. Reversing the flow of fluid through the ram will cause upward movement of the ram piston for rotating the spool 77 counter-clockwise. Movement of the ram piston to its upward limit in the cylinder 91 will be effective through the rack 87, the pinion 81, the spool 77 and the cable 72 for adjusting the sheave 35 rearwardly to the position designated 94. Any other position such as those designated 95 and 96 can be obtained by causing the piston 88 to come to rest at corresponding positions in the ram cylinder.

Usually the load supporting sheave 35 will be adjusted into the position 94 to expedite manipulation of the line 29 for attachment or detachment to an end of the elongated load. The winch 23 will allow the line 32 to be payed out over the various sheaves to provide ample length of the line to depend from the sheave 35 for passing about and attaching onto the load. Subsequent to attaching the line to the load the line will be wound onto the winch for lifting the front end of the load. The sheave 35 will be allowed to remain in the position 94 for imposing the weight of the load onto the sulky wheels 45 and 46 until a condition is encountered making it desirable to increase the contact pressure between the tractor wheels and the ground. Thereupon the hydraulic ram 91 will be energized for causing the sheave 35 to be adjusted forwardly a distance to impose the desired additional weight onto the tractor. Subsequent to the emergency requiring the additional weight upon the tractor the hydraulic ram will be energized for reversing the movement of the cable 72 for shifting the sheave 35 back to the position 94.

While the loaded vehicle train is passing over irregular off-the-highway terrain the operator of the vehicles may desire to leave the sheave 35 in its most forward position along the track 51 excepting when it is becomes necessary to cause the loaded train to turn sharply for avoiding an obstacle. When this occasion arises the operator can cause energization of the ram for shifting the sheave 35 to the rear most position 94 to enable the sulky frame to turn at a greater angle relatively to the load. The execution of such a sharp turn is illustrated by the plan view in Fig. 7 which shows the second embodiment of the invention.

Inasmuch as the flight 32 of the load line 29 is directed from the guide pulley 33 toward the axis 22 about which the drawbar structure 12 is pivotally connected with the tractor, the effective application of all forces from the trailer onto the tractor is at said axis 22. The force exerted through the load supporting cable 32 does not, therefore, disturb the balance attained by pivotally connecting the hitch structure 12 to the tractor at the axis 22.

The embodiment shown in Figs. 5 and 6 is generally of the type of the first embodiment and has many parts which are identical with or respectively correspond to parts in the first embodiment. Therefore, to expedite this disclosure the identical parts of the second embodiment are identified by the same respective reference characters as in the first embodiment whereas corresponding parts are designated by the same reference character with the addition of a prime, and there will be no repetition of description respecting such parts.

The frame of the sulky 13' differs from the frame in the first embodiment in the detail of being somewhat longer and in having a longer track structure 51' of which a rearward portion extends rearwardly beyond the axis of the sulky wheels. Also the track 51' has two load carrying sheaves, a forward sheave 35'F and a rearward sheave 35'R. There are two load carrying cables or lines 32'F and 32'R trained respectively over the sheaves 35'F and 35'R, the first of these cables being for attachment to the front end portion of a load 36 and the other of said cables being for attachment to a rear portion of such load so these two cables can cooperate for lifting the load completely from the ground. There are two pulleys 33' respectively for the lines 32'F and 32'R and likewise two pulleys 101 and two pulleys 24' respectively for these lines. Since the pulleys 33' are axially aligned as are the pulleys 101 and 24', only one of the pulleys in each of these pairs of pulleys is shown in Fig. 6. There are also two independently rotatable co-axial winch drums 23' respectively for the lines 32'F and 32'R.

Carriages 68'F and 68'R for the load-supporting sheaves 35'F and 35'R are controlled by separate cables 72' trained about their respectively associated pulleys 75' and spools 77' and each of these belt, pulley and spool assemblies is controlled by a hydraulic ram 91'.

Attachment of the lines 32'F and 32'R to an elongated load 36 is facilitated by energization of the two rams 91' for adjusting the sheaves 35'F and 35'R to their rearward most positions illustrated in Fig. 7. After attaching the lines to the load, such load and the sulky vehicle will be manipulated into axial alignment whereupon the winch drums 23' and the hydraulic rams 91' will be operated for placing the load carrying sheaves in some such position as illustrated in Fig. 6 and for winding in the lines for lifting the load from the ground. Sufficient length of line will be permitted to obtain between the sheaves 35'F and 35'R and the load depending therefrom to enable these sheaves to be moved lengthwise of the tract 51', attendant to causing the load to be somewhat elevated or lowered, depending upon whether these sheaves are adjusted rearwardly or forwardly, thus making it unnecessary to simultaneously operate the winches 23' for winding in or permitting payout of the lines. Shifting the load forwardly or rearwardly by forward or rearward adjustment of the load-carrying sheaves is accomplished for the purpose and under the circumstances explained herein above in connection with the first embodiment.

This second embodiment causes the component of force imposed upon the tractor by the load supporting lines to be applied to the tractor at the drawbar attaching axis 22' as in the case of the first embodiment, but accomplishes this result by mounting the pulleys 24' co-axially of the axis 22' and by utilizing the pulleys 101 in such a position upon the trailing vehicle that the flights 102 of said lines extend in parallelism with the horizontal plane of the U-shaped drawbar 17'.

Having thus described a limited number of embodiments of the invention with the view of completely and concisely illustrating the same, I claim:

1. In a logging sulky; a frame having an unobstructed open bottom and an unobstructed rear end, said frame comprising laterally spaced side portions and a fore and aft extending track spaced upwardly from the bottom of said frame; a tongue extending forwardly and downwardly from the front end of the track; a plurality of load-carrying sheaves; means mounting said sheaves for independent movement upon and lengthwise of said track; stub axles respectively upon lower parts of the side frame portions and disposed between the ends of the track; means for adjusting one of the sheaves within a range lengthwise of the track and extending both forwardly and rearwardly of side axles; and means for adjusting the other sheave within a range lengthwise of the track and extending at least partially rearwardly of side axles; and ground engaging wheels respectively upon said axles.

2. In combination; tractor and trailer vehicles of which the trailer vehicle is of the sulky type having a frong end portion supported upon the tractor vehicle as a stabilizer therefor; a drawbar structure pivotally attached to the tractor for swinging movement about a horizontal axis disposed substantially below the traction wheel axles of the tractor, and said drawbar extending rearwardly from such axis; the trailer comprising a fore and aft extending track disposed in an elevated position thereon and also comprising a tongue structure projecting downwardly from a front end portion of the track; load-carrying sheave means; means mounting said sheave means upon the track for movement lengthwise thereof for changing the magnitude of a downward force component imposed by a load carried by the sheave structure through the tongue structure; and universal joint means for interconnecting the vehicles, said joint means comprising a bearing mounted upon a rearward portion of said drawbar and having a fore and aft extending axis, a multi-bearing element including a bearing element pivotally associated with the bearing on the drawbar and including a vertical bearing element rigidly associated with the first bearing element and a bearing upon the lower end of said tongue structure in complemental journalled relation with the second bearing element; a sheave complemental with the load-carrying sheave and mounted upon said forward end portion of the track, a tractor-mounted sheave; and a load supporting line trained about the tractor-mounted sheave and having a flight leading rearwardly to said complemental sheave and thence a flight leading rearwardly to and over the load-carrying sheave, and said tractor-mounted sheave being so disposed upon the tractor that the flight of said line between the complemental sheave and said tractor-mounted sheave is directed substantially into intersecting relation with the drawbar axis.

3. In combination; tractor and trailer vehicles of which the trailer vehicle is of the sulky type having a front end portion supported upon the tractor vehicle as a stabilizer therefor; a drawbar structure pivotally attached to the tractor for swinging movement about a horizontal axis disposed substantially below the traction wheel axles of the tractor, and said drawbar extending rearwardly from such axis; the trailer comprising a fore and aft extending track disposed in an elevated position thereon and also comprising a tongue structure projecting downwardly from a front end portion of the track; load-carrying sheave means; means mounting said sheave means upon the track for movement lengthwise thereof for changing the magnitude of a downward force component imposed by a load carried by the sheave structure through the tongue structure; and universal joint means for interconnecting the vehicles, said joint means comprising a bearing mounted upon a rearward portion of said drawbar and having a fore and aft extending axis, a multi-bearing element including a bearing element pivotally associated with the bearing on the drawbar and including a vertical bearing element rigidly associated with the first bearing element and a bearing upon the lower end of said tongue structure in complemental journalled relation with the second bearing element; a tractor-mounted sheave; sheave means mounted on the trailer rearwardly of the tractor-mounted sheave; and a load supporting line trained about the tractor-mounted sheave and having a flight leading rearwardly over said sheave means to the load-carrying sheave, and said tractor-mounted sheave being so disposed on the tractor that said line flight is directed substantially into intersecting relation with the drawbar axis.

LOVEL REYNOLDS SIMMONS.

REFERENCES CITED

The following references are of record in the file of this patent:

UNITED STATES PATENTS

| Number | Name | Date |
|---|---|---|
| 898,501 | Pederson | Sept. 15, 1908 |
| 1,006,488 | Leon | Oct. 24, 1911 |
| 1,920,613 | Walker | Aug. 1, 1933 |
| 1,990,731 | Greer | Feb. 12, 1935 |
| 2,321,198 | Graves | June 8, 1943 |
| 2,405,299 | Godwin | Aug. 6, 1946 |
| 2,433,822 | Bartholomew | Dec. 30, 1947 |
| 2,438,534 | Bowers | Mar. 30, 1948 |
| 2,448,119 | Peterson | Aug. 31, 1948 |
| 2,504,232 | Smith | Apr. 18, 1950 |